(No Model.)

H. A. MANNING.
FILTER FOR COFFEE POTS.

No. 305,942. Patented Sept. 30, 1884.

Witnesses
J. R. Shumway
Jos. C. Earle

Henry A. Manning
Inventor
By Atty
Wm. C. Earle

UNITED STATES PATENT OFFICE.

HENRY A. MANNING, OF NEW YORK, N. Y.

FILTER FOR COFFEE-POTS.

SPECIFICATION forming part of Letters Patent No. 305,942, dated September 30, 1884.

Application filed April 18, 1884. (No model.)

*To all whom it may concern:*

Be it known that I, HENRY A. MANNING, of New York, in the county of New York and State of New York, have invented a new Improvement in Filters for Coffee-Pots; and I do hereby declare the following, when taken in connection with accompanying drawings and the letters of reference marked thereon, to be a full, clear, and exact description of the same, and which said drawings constitute part of this specification, and represent, in—

Figure 1:
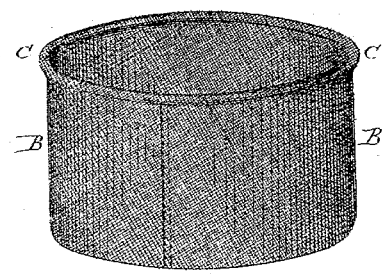
Figure 2:
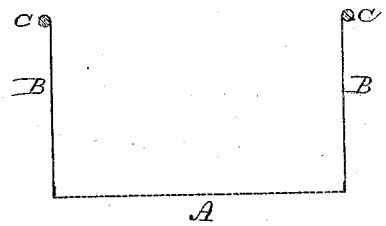

Figure 1, a perspective view; Fig. 2, a vertical central section.

This invention relates to an improvement in the construction of that class of filters for coffee-pots which are usually made from cloth or like fabric, and of cup shape, In the general construction of this class of filters the material is the same throughout—that is, the sides are the same as the bottom—and unless the filter be full of coffee the side of the bag above the coffee is exposed to the water, which readily passes through it into the pot below without permeating the coffee. This fact detracts materially from the utility of a fabric filter.

The object of my invention is to overcome this difficulty and yet construct the filter from fabric; and it consists in a filter made of cup shape, the bottom of a coarser or open-wove fabric, the walls or sides of close-woven fabric, as more fully hereinafter described.

In making the filter I show and prefer a circular shape. The bottom A is made from a soft open-woven or coarse textile fabric, and through which water will readily pass. The side B is made from a closer-woven or fine textile fabric through which water does not readily pass. The bottom is stitched to the sides in the usual manner, and the upper edge of the sides stitched to a ring, C, or other device by which it may be supported in the pot.

The coffee is introduced into the filter in the usual manner and water poured thereon. Because the water can more easily permeate the coffee than through the sides, it passes that way instead of flowing through the sides, as it would do were the sides of the same texture as the bottom.

The sides may be prepared so as to positively prevent the passage of water and yet retain the flexible textile character and all the advantages of a fabric filter; but such preparation is unnecessary, as when the sides are made from a hard close-woven fabric, the passage of the water is so much more difficult than through the coffee that none will escape through the sides, and thus I make a fabric filter possessing all the advantages of a solid-wall filter, as well as the advantages of a fabric filter.

I claim—

The herein-described cup-shaped filter, consisting of the open-fabric bottom and close-fabric sides, substantially as described.

HENRY A. MANNING.

Witnesses:
JAS. S. TAYLOR,
EDW. A. GRENZBACH.